United States Patent [19]
Moritz et al.
[11] 3,835,262
[45] Sept. 10, 1974

[54] VIDEO DISC CUTTING USING PRESSURIZED AIR TO CONTROL DEPTH OF GROOVES

[75] Inventors: Scott N. Moritz, Villa Park; Eugene Polley, Lombard; Werner H. Puls, Northbrook, all of Ill.

[73] Assignee: Zenith Radio Corporation, Chicago, Ill.

[22] Filed: June 4, 1973

[21] Appl. No.: 366,812

[52] U.S. Cl. .................... 179/100.4 C, 178/6.6 B
[51] Int. Cl. .................... G11b 3/72, G11b 25/04
[58] Field of Search ........... 179/100.4 C, 100.4 ST, 179/100.4 R, 100.2 P; 340/174.1 E; 178/6.6 B

[56] References Cited

UNITED STATES PATENTS

| | | | |
|---|---|---|---|
| 2,867,694 | 1/1959 | Pearson, Jr. | 179/100.4 C |
| 2,948,783 | 8/1960 | Scully | 179/100 A |
| 3,031,532 | 4/1962 | Lynott | 179/100.2 P |

FOREIGN PATENTS OR APPLICATIONS

| | | |
|---|---|---|
| 2,136,411 | 2/1973 | Germany |

OTHER PUBLICATIONS

Rice et al., An Experimental Television Recording and Playback Systems Using Photographic Discs, Journal of the SMPTE, Nov. 1970, Vol. 79, page 997.

*Primary Examiner*—Alfred H. Eddleman
*Attorney, Agent, or Firm*—John H. Moore

[57] ABSTRACT

A method and apparatus for controlling the depth to which grooves are cut in a master video recording disc. Pressurized air is directed toward the surface of the disc in order to lift and maintain a cutting stylus assembly at a predetermined height above the surface of the disc, thereby assuring that the grooves will be cut to a predetermined reference depth.

4 Claims, 4 Drawing Figures

PATENTED SEP 10 1974 3,835,262

VIDEO DISC CUTTING USING PRESSURIZED AIR TO CONTROL DEPTH OF GROOVES

BACKGROUND OF THE INVENTION

This invention is generally related to the art of manufacturing disc recordings for use in video playback systems. It is particularly directed to the cutting of a master disc from which many plastic video recording discs may be formed.

In recent years, great effort and expense has gone into the development of suitable video recording and playback systems and their associated equipment. One such system records the video information on vinyl recording discs somewhat similar in appearance to popular audio records. The information on the disc is retrieved by means of a playback machine which converts the recorded information to electrical signals for visual presentation on a television screen.

The vinyl discs which are used with video playback systems are generally formed from a master disc which is first cut with grooves which contain the recorded information. It is then generally given a metal coating by electroplating or other suitable methods, after which it can be used to stamp out vinyl recording discs for consumer use.

Although the term "master" is often used to describe a metal or metal-clad disc which is used in the stamping operation, its use herein is confined to that of describing the deformable disc which is initially cut and which later receives a metal coating.

The master typically contains as many as 400 grooves per millimeter, each of which is cut to an average depth of about 0.8 microns. It is apparent that with grooves as shallow and as closely spaced as this, great care is required in the cutting of the master in order to assure that the video information is accurately recorded.

The video information is stored on the master disc by means of a cutting stylus which cuts grooves into a rotating master. The motion of the stylus is modulated in accordance with the information content of a video signal, thereby imparting to the grooves a contour which corresponds to the information to be recorded.

In the case of master discs which are cut by a stylus vibrating in a vertical plane in response to a modulating video signal, the resulting stylus motion may impart a "hill and dale" contour to the grooves. In such a system, the modulation may be described as FM (frequency modulation) since the frequency with which the hills and dales occur is an indication of the information content of the video signal. As in most FM systems, the amplitude of the hills and dales should be constant. Any variation in the depth of a groove operates as an unwanted interference with the recorded signal.

Cutting a master video disc so as to eliminate unwanted variations in the depth of the grooves will result in a high quality master disc. A method and apparatus for so cutting the masters is the end to which the present invention is directed.

Objects of the Invention

Accordingly, it is a general object of this invention to provide improved method and apparatus for cutting master video discs.

It is a more specific object of the invention to provide method and apparatus for more accurately controlling the depth to which grooves are cut in the master discs.

Summary of the Invention

This invention pertains specifically to method and apparatus for cutting grooves into a master recording disc. According to this invention, a stream of pressurized air is directed downwardly onto an uncut portion of the recording disc so as to lift a cutting stylus and control its spatial relationship relative to the surface of the recording disc. In this way, the depth to which the stylus cuts a disc can be accurately controlled.

BRIEF DESCRIPTION OF THE DRAWINGS

The features of the invention which are believed to be novel are set forth with particularity in the appended claims. The invention, together with further objects and advantages thereof, may best be understood by reference to the following description taken in conjunction with the accompanying drawings in which like reference numerals identify like elements, and in which:

DESCRIPTION OF THE PREFERRED EMBODIMENT

One method of cutting master discs involves vibrating a cutting stylus in a vertical plane in response to an electrical signal such as a video signal of the type generally found in television systems. The electrical signal stimulates the stylus via a transducer to generate the required stylus motion. Any extraneous elements which might influence the way in which a cutting stylus vibrates as it cuts grooves in a master disc will operate to distort the actual information content of the recorded signal.

As described briefly above, the vertical motion of a cutting stylus imparts a contour to the grooves of the disc which is related to the information to be recorded. Therefore, anything which might influence the contour of a groove will be interpreted by a playback machine as being a part of the desired video information. For example, vibrations which cause a cutting stylus to cut too deeply into a groove will impart thereto an erroneous imprint which will appear as a distortion in the video signal which is recovered during the process of playback.

The distortions alluded to above can be avoided by accurately controlling the depth to which the unmodulated stylus cuts. This depth will be referred to herein as the reference depth. When modulation is applied to the stylus, it will then vibrate both above and below the reference depth in accordance with the information content of the applied video signal.

In order to put into practice the concept of fixing the predetermined reference depth to which the unmodulated stylus cuts a disc, one must constantly maintain the height of the cutting stylus and its supporting assembly at a fixed vertical distance relative to the surface of the disc. One method of obtaining the required strict tolerance in this distance is to maintain very close tolerances on all parts of a disc cutting machine which would affect the height of the stylus relative to the surface of the disc. Disc cutting machines have been built which attempt to solve this problem by the means just described; however, such machines tend to be expensive, bulky, and less accurate than desired. The problems associated with machining and maintaining a disc cutting apparatus whose cumulative tolerances are within the limits required for cutting grooves whose average depth is .8 microns can be readily appreciated.

According to this invention, the problem of maintaining the cutting stylus at its preferred vertical position is attacked by focusing attention directly on the stylus and the disc surface to take advantage of known dimensional relationships between those elements and to remove from consideration all tolerances associated wtih other parts of the cutting machine.

Figure 1:
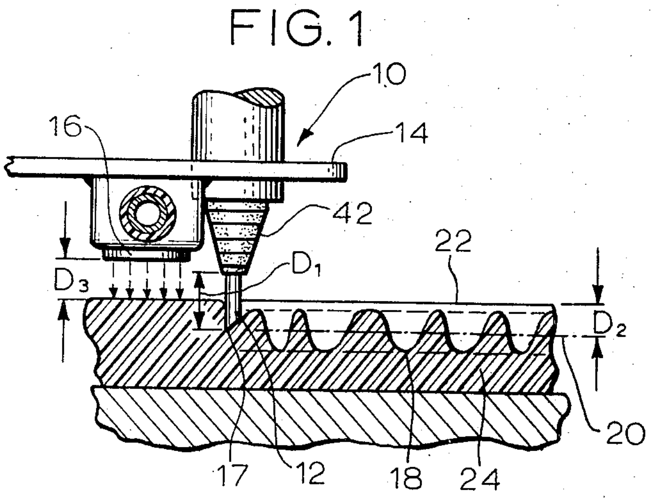
FIG. 1 schematically portrays relevant dimensional relationships between a cutting stylus and a recording disc.

The dimensional relationships between a stylus assembly and a disc which are of importance can be most easily understood by reference to FIG. 1. A simplified stylus assembly 10, shown schematically, consists of a cutting stylus 12, a supporting platen member 14, and a gas outlet port 16 which will be described in more detail below. The stylus cutting tip 17 cuts a varying contour into the disc as depicted by line 18. This contour is representative of the information being recorded and goes above and below the reference depth which is depicted as dashed line 20. In the absence of any modulation applied to the stylus, cutting tip 17 should cut a groove to the reference depth as shown by line 20.

The stylus is shown as having a length $D_1$. The groove reference depth is $D_2$, and the distance between the disc surface 22 and the gas outlet port 16 is $D_3$.

Assuming that the length $D_1$ of the stylus and the reference depth $D_2$ to which an unmodulated stylus is to cut are both known, the distance $D_3$ between the gas outlet port and the disc surface 22 is fixed. The distance $D_3$ is held to a tolerance achievable only with much difficulty by prior art disc cutting methods. According to this invention the tolerances associated with other parts of the disc cutting machine are completely bypassed and the distance $D_3$, and therefore also the reference depth $D_2$, are established and accurately controlled by first allowing the stylus assembly 10 to rest on the surface of the disc and then directing a laminar flow of gas directly onto the disc surface 22 through outlet port 16. The gas is maintained at a pressure effective to generate forces on the platen member 14 which counteract the weight of the stylus assembly 10 and lift the stylus assembly to a predetermined height $D_3$. By varying the pressure on the gas, the forces acting on platen member 14 can be varied so as to control the spatial relationship between the stylus cutting tip 17 and the surface 22 of the disc and to thereby control the reference depth to which the grooves are cut.

The effects which counteract the weight of the stylus assembly include an action-reaction force on the gas outlet port 16 and an air cushion formed between the outlet port and the disc surface 22. By controlling the pressure of the gas to control the spatial relationship between the stylus cutting tip 17 and the disc surface 22, the reference depth to which the grooves are cut can be controlled to within a fraction of a micron.

When using the above-described method to cut a video recording disc, the pressurized gas should be directed onto an uncut portion of the disc surface. This can be accomplished by directing the gas onto that portion of the disc which lies between the center of the disc and the stylus. As the stylus is caused to move nearer to the center of the disc, the air will always be directed onto a portion of the disc which is as yet uncut. To appreciate the significance of directing the pressurized air onto an uncut portion of the disc, consider the effects of directing the gas onto a portion of the disc which lies between the outer perimeter of the disc and the stylus. When a cutting operation begins, the air will be directed toward an uncut portion of the disc, but as the cutting proceeds and the stylus and the gas outlet port move together toward the center of the disc, the air will soon encounter the grooves which have been cut into the disc. As the pressurized air meets the transition between the uncut portion of the disc and the area which has been cut, the distance $D_3$ (FIG. 1) between the disc surface and the gas outlet port can change because of the uneven surface characteristics of the cut disc. This change will, of course, be reflected in the depth to which the stylus cuts.

Figures 2, 3:
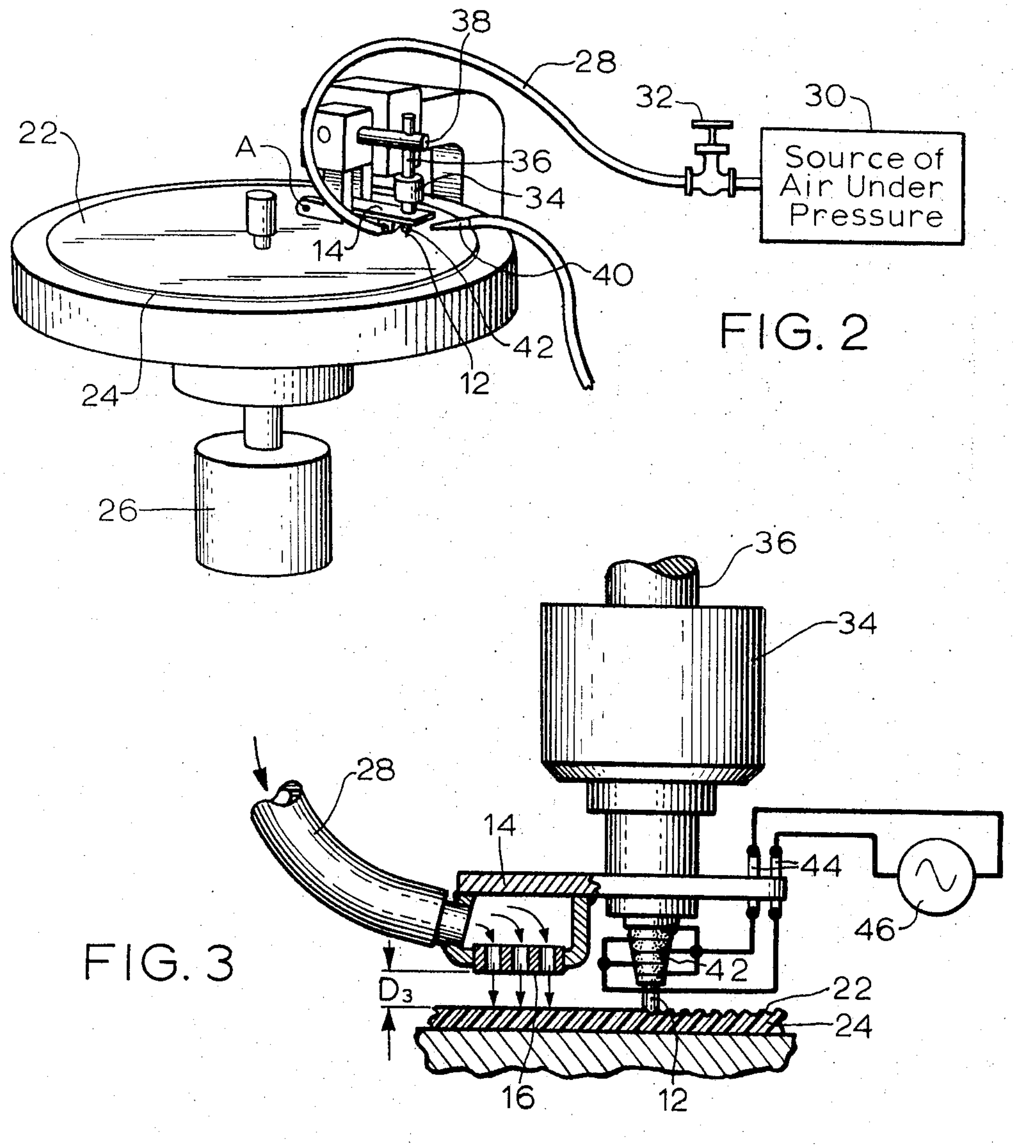
FIG. 2 is a perspective view of a cutting stylus assembly for practicing the invention.
FIG. 3 is a side view, partly in schematic form, of a portion of the FIG. 2 assembly.

Apparatus for implementing the above-described disc cutting method is shown, partly in schematic form, in FIG. 2. A recording disc 24 is rotated at a predetermined cutting speed by motor assembly 26. A platen member 14 supports stylus 12 and has an outlet port 16 (shown in FIG. 3) through which air is directed downwardly onto the surface of the disc. A tube 28 is connected to outlet port 16 and conducts pressurized air from a source of pressurized air 30 through a control valve 32. The control valve controls the pressure of the air which passes through tube 28 and outlet port 16, thereby controlling the reference depth to which grooves are cut in the disc.

Platen member 14 is hinged at point A to allow free vertical movement of the platen, stylus, and gas outlet port. A dashpot 34 couples the stylus to a shaft 36 which is in turn coupled to a movable arm 38 which controls the horizontal movement of the stylus. Dashpot 34 helps to absorb vibrations which are imparted to shaft 36 and thus tends to suppress chatter in the stylus.

A vacuum line 40 may be positioned with its open end behind and adjacent to the tip of stylus 12 to assist in the removal of particles which have been cut from the disc.

Referring now to FIG. 3, details of the disc cutting apparatus are shown which were either not visible or omitted for purposes of clarity in the FIG. 2 illustration. A transducer assembly 42 consists of a series of stacked transducers and is coupled directly to the stylus 12. Binding posts 44 provide connection points for electrically connecting the transducer assembly to a source 46 of electrical signals which contain the information to be recorded.

When using the FIG. 3 stylus assembly, the pressure of the air will preferably be within the range of from 3 to 5 pounds per square inch. This will maintain the illustrated assembly at a height sufficient to cut grooves to a reference depth of about .8 microns.

It should also be noted that the rotational speed of the disc is usually in the range of from 33 ⅓ to 78 revolutions per minute during the cutting operation. This is normally much slower than the playback speed of a finished disc.

Outlet port 16 is shown as consisting of a plurality of openings through which the compressed air is channeled. Thus, the air will exit port 16 as a plurality of laminar streams of air. This tends to reduce the effects of possible turbulence in the air flow and to thereby assist in the accurate control of the cutting height of the stylus.

Figure 4:
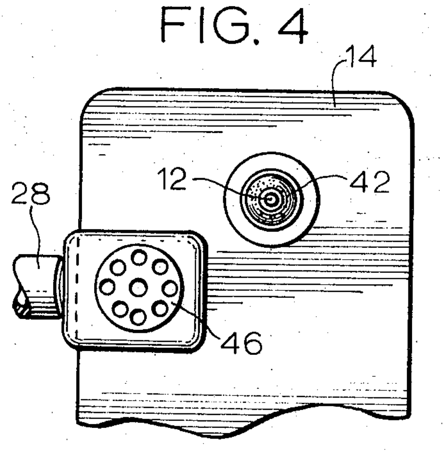
FIG. 4 is a schematic bottom view of the FIG. 3 stylus assembly.

FIG. 4 is a view of the bottom side of platen member 14 showing the details of the gas outlet port 16. The outlet port is covered by a screen-like member 46 having a plurality of holes which cause the air to exit the outlet port as a plurality of laminar gas streams and to thereby suppress turbulence in the flow of air.

While the invention has been described in conjunction with specific embodiments thereof, it is evident that many alterations, modifications and variations will be apparent to those skilled in the art in light of the above disclosure. Accordingly, it is intended to embrace such alterations, modifications and variations which fall within the spirit and scope of this invention as defined by the appended claims.

I claim:

1. A method of cutting a video recording disc master comprising:

rotating the disc at a predetermined speed with the stylus in cutting position on the disc;

vibrating the stylus in response to a video information bearing signal for imparting to a groove a varying contour which corresponds to the information to be recorded;

directing a laminar flow of gas under pressure downwardly onto an uncut portion of the disc substantially adjacent to the stylus; and controlling the pressure of the gas to control the spatial relationship between the stylus cutting tip and the surface of the disc in order to control the reference depth to which the grooves are cut.

2. Video disc cutting apparatus for cutting grooves in a rotating master recording disc comprising:

a cutting stylus for cutting grooves in the disc;

a transducer mechanically coupled to the stylus for imparting vibratory motion to the stylus in response to an electrical signal input; and means rigidly coupled to the stylus for directing a laminar flow of gas onto an uncut portion of the disc at a pressure and rate effective to lift the apparatus a predetermined distance above the disc surface so as to cause the stylus to cut the grooves to a predetermined reference depth.

3. The disc cutting apparatus as defined in claim 2 wherein the gas directing means includes a tube which is coupled to a source of gas under pressure and which has a downwardly-facing outlet port adjacent to the stylus.

4. The apparatus as defined in claim 3 wherein the gas outlet port is covered by a screen-like member having a plurality of holes which cause the gas to exit the outlet port as a plurality of laminar gas streams directed downwardly toward the surface of the disc.

* * * * *